United States Patent
Holy

(10) Patent No.: US 6,904,603 B2
(45) Date of Patent: Jun. 7, 2005

(54) DEVICE FOR STORING DISC-SHAPED INFORMATION CARRIERS AND FOR THEIR SUBSEQUENT SELECTIVE MANIPULATION

(75) Inventor: Petr Holy, Prague (CZ)

(73) Assignee: Sunrea, A.S., Prague (CZ)

( * ) Notice: Subject to any disclaimer, the term of this patent is extended or adjusted under 35 U.S.C. 154(b) by 168 days.

(21) Appl. No.: 10/365,522

(22) Filed: Feb. 13, 2003

(65) Prior Publication Data

US 2004/0062156 A1 Apr. 1, 2004

(30) Foreign Application Priority Data

Oct. 1, 2002 (CZ) .......................................... 2002-3267

(51) Int. Cl.[7] .......................... G11B 17/03; G11B 17/04; G11B 33/02
(52) U.S. Cl. ..................................................... 720/600
(58) Field of Search ................................ 720/600, 652, 720/614; 414/935, 940; 369/30.44, 30.5, 30.56, 30.62, 30.71, 30.79, 30.86, 30.91

(56) References Cited

U.S. PATENT DOCUMENTS

| | | | | |
|---|---|---|---|---|
| 4,754,445 A | * | 6/1988 | Young et al. | 369/30.86 |
| 5,065,265 A | * | 11/1991 | Pierrat | 360/92 |
| 5,841,744 A | | 11/1998 | Menke et al. | 369/30.85 |
| 6,134,212 A | | 10/2000 | Pines et al. | 369/30.85 |
| 6,163,511 A | | 12/2000 | De Vries | 369/30.77 |

* cited by examiner

Primary Examiner—Julie Anne Watko
(74) Attorney, Agent, or Firm—Burns, Doane, Swecker & Mathis, L.L.P.

(57) ABSTRACT

Device for storing disc-shaped information carriers and for their subsequent selective manipulation. The disc-shaped information carriers can be placed on carriers arranged in a circle around the manipulator axis of rotation. The design with partially turnable carriers allows for arrangement of the carriers on the axes of partial turning in columns. The manipulator consists at least of two arms. The long arm is equipped with a movable arm and the short arm is equipped with a picker of disc-shaped information carriers. By swinging out of the movable arm against the carrier, the carrier is turned out and the given tray is separated from the others and it can thus be served by the manipulator.

9 Claims, 5 Drawing Sheets

DEVICE FOR STORING DISC-SHAPED INFORMATION CARRIERS AND FOR THEIR SUBSEQUENT SELECTIVE MANIPULATION

CROSS REFERENCE TO RELATED APPLICATION

This application is related to Provisional application No. 60/355,971

Filling date: Feb. 12, 2002

Name of Applicant: Petr Holy, Prague, CZECH REPUBLIC

Tittle of Invention: Apparatus for storing disc-shaped information carriers and selective access and/or retrieval thereof

STATEMENT REGARDING FED SPONSORED R&D

Not Applicable

BACKGROUND OF THE INVENTION

Generally, the disc-shaped information carriers are stored together with casings in drawers from which they are retrieved as needed, to be stored again in the original location. The upper surface of the casing is marked with a label for easy retrieval of the carrier. Storage cases with the drawers occupy a considerable ground area. Manual manipulation is slow and demanding as far as the accuracy of restoring is concerned.

This drawback is removed by the devices for storing information carriers and for their subsequent selective manipulation. Such devices resolve not only the optimum usage of space but also reliable restoring of the disc-shaped information carrier in the original location, without any intervention of the human factor. In some devices, the disc-shaped information carriers are stored in rows next to each other. The retrieving mechanism travels, generally together with the playing unit, along the row of disc-shaped information carriers stored in the vertical manner. The vertical storage of disc-shaped information carriers brings the advantage that in order to stabilize their position only a groove suffices in which the disc-shaped information carrier fits with its edge. Upon playing the information, the retrieving mechanism also serves for restoring the disc-shaped information carrier in its original location in the row. Such a solution means insufficient usage of space, as for the retrieving mechanism travelling and possibly also for the playing unit, free space needs to be reserved permanently, having similar volume as the row of the disc-shaped information carriers stored, used on the short-term basis only when the retrieving mechanism travels, like e.g. in case of the U.S. Pat. No. 6,134,212. The design in which the retrieving mechanism is used for two opposite rows of the disc-shaped information carriers stored, like in case of the U.S. Pat. No. 5,841,744, resolves this problem partially only. Design according to the U.S. Pat. No. 6,163,511 represents better usage of space, in which the disc-shaped information carriers are distributed along a circular track in trays. In the middle of the circular track, the mechanism for selective manipulation with the disc-shaped information carrier is located. The trays are placed in layers above each other. Usage of space is better, however, since there must be a gap between individual trays, the density is still low. This necessary gap serves for insertion of the arm with the picker into the space between the trays without causing damage to any of the disc-shaped information carriers.

BRIEF SUMMARY OF THE INVENTION

The drawbacks mentioned are removed by the device according to the invention for storing disc-shaped information carriers and for their subsequent selective manipulation. The disc-shaped information carriers can be placed on carriers arranged in a circle around the manipulator axis of rotation. Both opposite ends of the carriers are equipped with trays adapted for placement of the disc-shaped information carriers. The carriers revolve around the vertical axis of partial turning, parallel both with the axis of trays as well as with the axis of the manipulator rotation. The rotary arrangement of the carriers with a couple of trays facilitates both storing of the disc-shaped information carrier as well as its subsequent retrieving. The rotary movement is exactly definable and facilitates approaching of the tray to the manipulator which operates in a shorter distance from the axis of its rotation. For this reason, it is optimum for the trays to be arranged on the carrier symmetrically around the axis of partial turning of the carrier. When turned partially in any sense of rotation, the tray is found in the same distance from the manipulator axis of rotation.

On the connecting line between both trays, the carriers are equipped, on one side at least, with a radial track the radius of which is identical with a circle drawn from the manipulator axis of rotation. In order to observe the mutual, exactly geometrically defined distances, it is advantageous in the circular movement of the manipulator if the manipulator is found permanently in the same distance from the radial track. Therefore it is most advantageous for this radial track to be represented by the outer edge of the carrier.

For the location of the carrier to be the same permanently, both in the position of maximum approach of the tray to the manipulator and thus allowing for its cooperation in manipulation with the disc-shaped information carrier or in the position in which the radial track is found in a position identical with a circle drawn from the manipulator axis, a position delimiter is arranged between the carrier and the axis of partial turning.

The manipulator consists at least of two arms. The long arm is equipped with a movable arm, while between the long arm and the movable arm, a drive is inserted. The short arm is equipped with a picker of disc-shaped information carriers. By swinging out of the movable arm against the carrier, the carrier is turned, which causes the tray with the required disc-shaped information carrier to become nearer the picker which, upon its partial turning, is moved into the centre of the tray and is thus able to grab or store the disc-shaped information carrier. For easy searching for the position of the tray centre for the purpose of manipulation with the disc-shaped information carrier, it is advantageous if the distance of the manipulator axis of rotation and of the carrier axis of partial turning equals the sum of distances of the axis of rotation from the picker and of the axis of partial turning from the tray centre.

The design provided above with partially turnable carriers allows for arrangement of the carriers on the axes of partial turning in columns. By turning the carrier out, the given tray is separated from the others and it can thus be served by the manipulator picker without any danger of damaging or colliding with any part of the device or any disc-shaped information carrier.

In a device designed in this manner, the manipulator can be used for multiple carriers organized in columns. For this reason, the carriers and/or the manipulator are arranged against each other in the vertical, adjustable manner.

BRIEF DESCRIPTION OF THE DRAWINGS

The ground arrangement of the device according to the invention with partial turning of the carrier in progress is shown in FIG. 1, arrangement of two carriers in the disassembled condition above each other is shown in FIG. 2, detailed view of the position delimiter formed by a couple of permanent magnets is shown in FIG. 3, detailed view in the cross-section of the position delimiter formed by a spring-cushioned pawl is shown in FIG. 4, and the general arrangement of the carriers around the axis of rotation with the manipulator in the axonometric view is shown in FIG. 5.

DETAILED DESCRIPTION OF THE INVENTION

Figure 1:
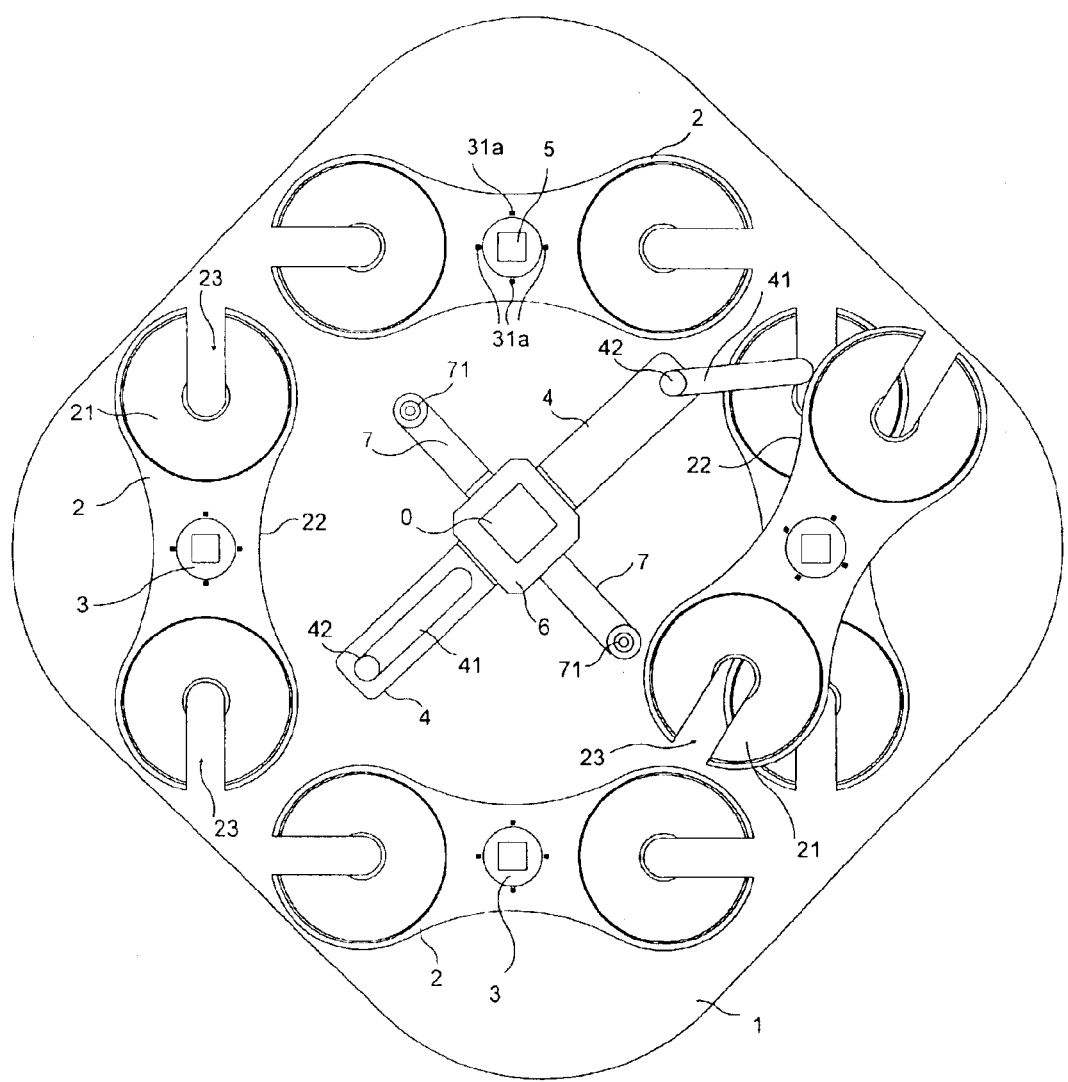
Figure 2:
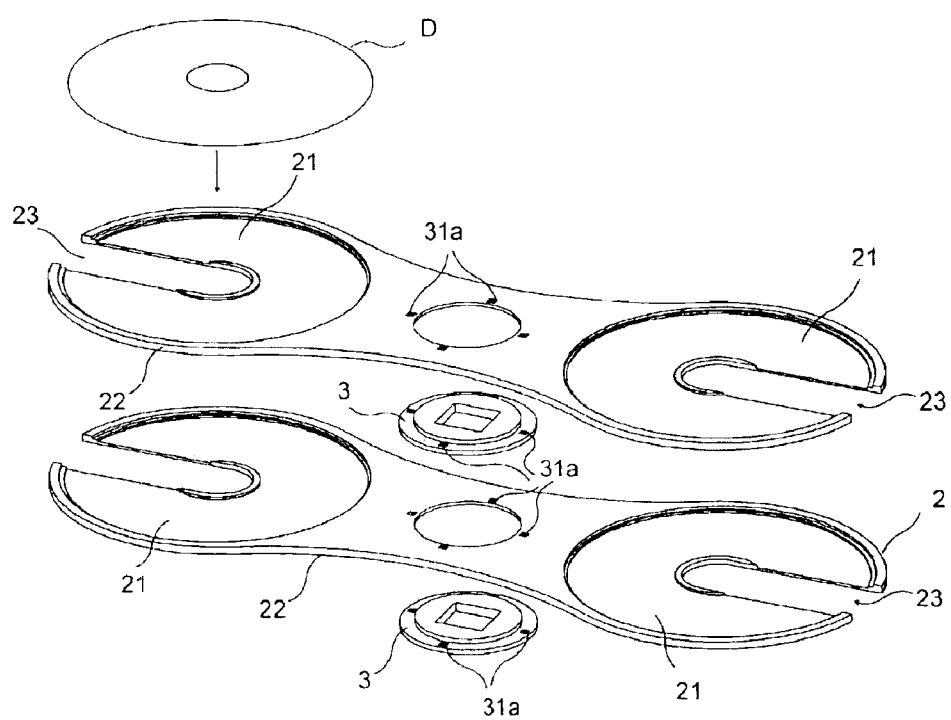
Figure 3:
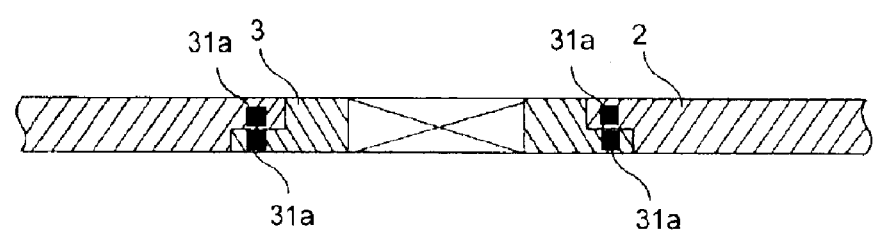
Figure 4:
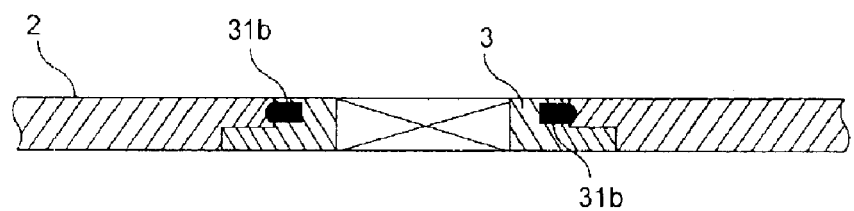
Figure 5:
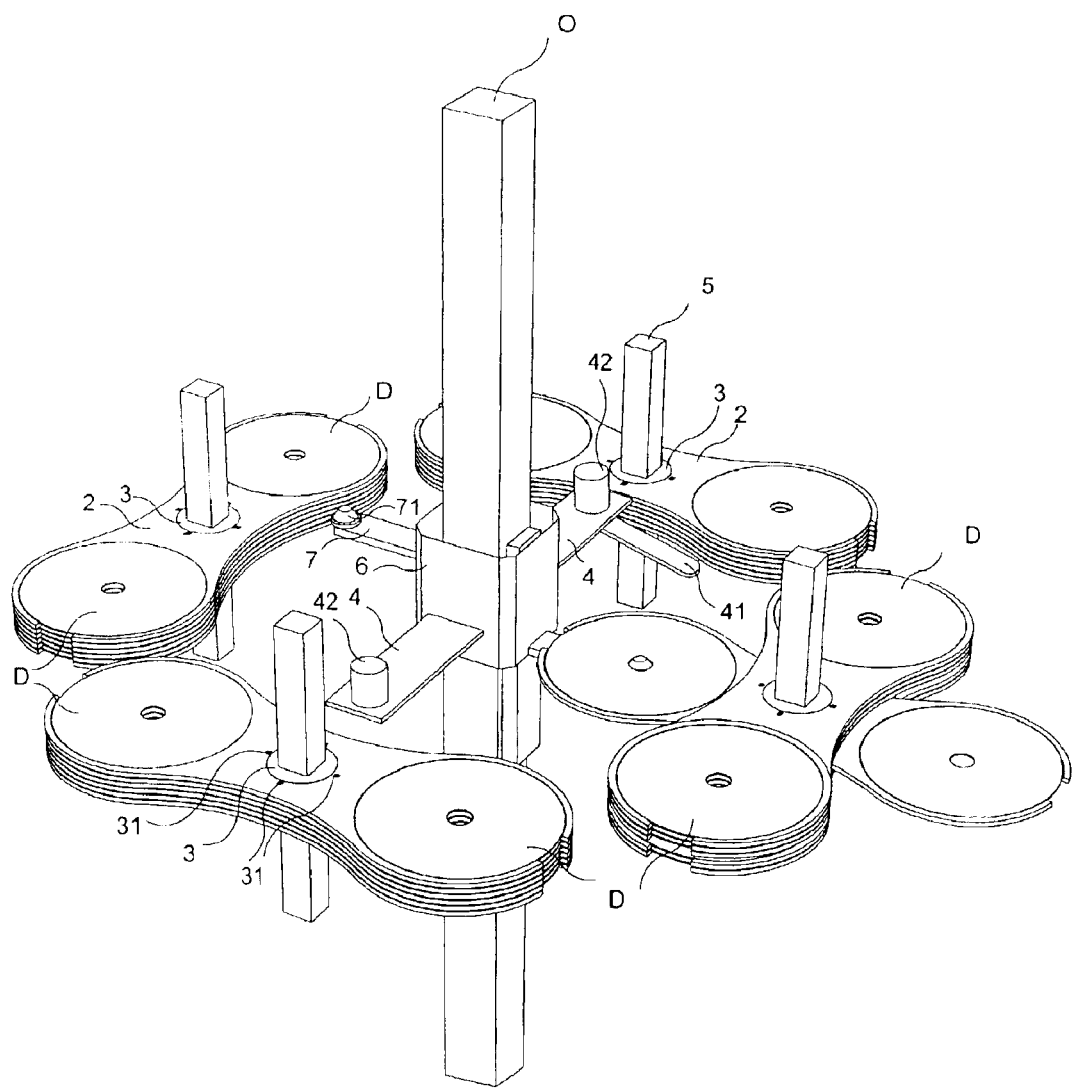

On frame 1, the manipulator axis of rotation O is fastened, and in a circle around the axis of rotation O, the axes of partial turning 5 of carriers 2 are fastened. The carriers 2 are equipped on both opposite ends with trays 21 for storing of disc-shaped information carriers D. The axis of rotation O of the manipulator 6 and axes of partial turning of the carriers 2 are parallel with axes of the trays 21. The trays 21 are arranged on every carrier 2 symmetrically around the axis of partial turning 5 of the carrier 2. The outer edge of the carrier 2 on the connecting line between the trays 21 is formed by the track 22 the radius of which is identical with a circle drawn from the axis of rotation O of the manipulator 6. On the axis of partial turning 5, in this case formed by a square rod, axial bearings 3 are fastened, on which the carriers 2 are bedded in the partially turnable manner. Between every carrier 2 and the axial bearing 3, position delimiters 31a, 31b are arranged. The position delimiters 31a, 31b stabilize the carrier 2 both in the position in which the trays 21 with disc-shaped information carriers D are not accessible, as well as in the position in which the trays 21 are accessible for the manipulator 6, upon partial turning of the carrier 21. In FIG. 3, the position delimiters are formed by couples of permanent magnets 31a, and in FIG. 4, the position delimiters are formed by spring-cushioned pawls 31b. The manipulator 6 consists of at least two arms 4, 7. The long arm 4 is equipped with the movable arm 41. Between the movable arm 41 and the long arm 4, the drive 42 is inserted. The short arm 7 is equipped with the picker 71 of disc-shaped information carriers D. The recesses 23 in trays 21 of carriers 2 correspond with the short arm 7.

The distance of the axis of rotation O of the manipulator 6 from the axis of partial turning of the carrier 2 equals the sum of distances of the axis of rotation O from the picker 71 and the axis of partial turning 5 from the centre of the tray 21. Axial bearings 3 with carriers 2 are arranged in columns on the axes of partial turning 5. The manipulator 6 is arranged in the vertical, adjustable manner on the axis of rotation O.

Based on the program input the goal of which is storing or selective manipulation with a selected disc-shaped information carrier D, vertical adjustment of the manipulator 6 is performed. One of the long arms 4 with its movable arm 41 moves on the level of the relevant carrier 2, in one of the trays 21 of which the required disc-shaped information carrier D is found. The movable arm 41 pushes, using force supplied by the drive 42, to the radial track 22 of the carrier 2, on the opposite side from where the required disc-shaped information carrier D is stored in the tray 21. Upon overcoming the resistance of the position delimiter 31a, 31b, the arm 2 swings out and subsequently it is stabilized again in the radial position by the position delimiter 31a, 31b. The recess 23 of the tray 21 is directed radially towards the centre of rotation O of the manipulator 6. Subsequently, the manipulator 6 turns partially so that one of its short arms 7 with the picker 71 is moved in the co-axial manner below the centre of the tray 21, and thus also below the centre of the disc-shaped information carrier D, stored in the tray 21. The manipulator 6 subsequently performs a vertical movement and the disc-shaped information carrier D is transported to the place where, for example, the playing unit is found, not shown here, or the disc-shaped information carrier D is retrieved only. In subsequent storing of the disc-shaped information carrier D back into the appropriate tray 21, the opposite procedure is performed.

What I claim as my invention is:

1. Device for storing disc-shaped information carriers and for their subsequent selective manipulation, wherein the disc-shaped information carriers (D) can be placed on carriers (2) arranged in a circle around the axis of rotation (O) of the manipulator (6), while both opposite ends of the carriers (2) are equipped with trays (21) adapted for placement of the disc-shaped information carriers (D), where the carriers (2) are rotary around the vertical axis of partial turning (5), parallel both with the axis of the trays (21) as well as with the axis of rotation (O) of the manipulator (6).

2. The device as claimed in claim 1, wherein the trays (21) are arranged on the carrier (2) symmetrically around the axis of partial turning (5) of the carrier (2).

3. The device as claimed in claim 1 or 2, wherein the carriers (2) are equipped on the connecting lines between both trays (21), at least from one side, with the radial track (22) the radius of which is identical with a circle drawn from the axis of rotation (O) of the manipulator (6).

4. The device as claimed in claim 3, wherein the radial track (22) forms the outer edge of the carrier (2).

5. The device as claimed in claim 1 or 2, wherein the position of partial turning or the carrier (2) is the position delimiter (31a, 31b) arranged between the carrier (2) and the axis of partial turning (5).

6. The device as claimed in claim 1 or 2, wherein the manipulator (6) consists of at least two arms (4, 7) out of which the long arm (4) is equipped with a movable arm (41), where between the long arm (4) and the movable arm (41), the drive (42) is inserted, while the short arm (7) is equipped with the picker (71) of disc-shaped information carriers (D).

7. The device as claimed in claim 6, wherein the distance of the axis of rotation (O) of the manipulator (6) and the axis of partial turning (5) of the carrier (2) equals the sum of distances of the axis of rotation (O) from the picker (71) and the axis of partial turning (5) from the centre of the tray (21).

8. The device as claimed in claim 1 or 2, wherein the carriers (2) are arranged on the axes of partial turning (5) in columns.

9. The device as claimed in claim 8, wherein the carriers (2) and/or the manipulator (6) are arranged against each other in the vertical, adjustable manner.

* * * * *